United States Patent [19]

Bruylants et al.

[11] Patent Number: 4,945,145

[45] Date of Patent: Jul. 31, 1990

[54] SILANE COATING COMPOSITION FOR AMBIENT CURE

[75] Inventors: Paul P. Bruylants, Sicklerville; Patrick H. Corcoran, Cherry Hill, both of N.J.; John A. Simms, Wilmington, Del.

[73] Assignee: E. I. Du Pont de Nemours and Company, Wilmington, Del.

[21] Appl. No.: 334,514

[22] Filed: Apr. 6, 1989

[51] Int. Cl.$^5$ .............................................. C08F 30/08
[52] U.S. Cl. .................................... 526/279; 525/100; 525/102; 528/32; 528/33; 528/34; 528/38; 556/420
[58] Field of Search ................. 526/279; 525/100, 102; 528/32, 33, 34, 28; 556/420

[56] References Cited

U.S. PATENT DOCUMENTS 4,689,085  8/1987  Plueddemann .................... 528/33
4,801,658  1/1989  Furukawa et al. ................. 525/450

OTHER PUBLICATIONS

"M-TMI, a Novel Unsaturated Aliphatic Isocyanate", Pub. Jun. '86, pp. 43–47, Journal of Coatings Technology and Cyanimid Product Literature.

Primary Examiner—Melvyn I. Marquis
Attorney, Agent, or Firm—John M. Lynn

[57] ABSTRACT

A curable silane resin, and a process for making same, having at least one of two units selected from the group consisting of a prepolymer (C) and a prepolymer (F); the prepolymer (C) having the formula (I):

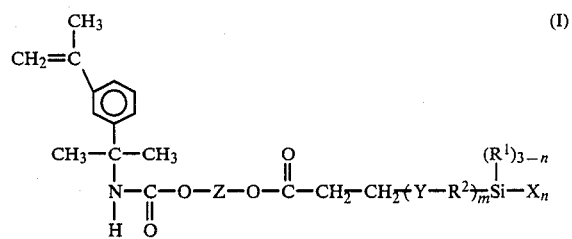

and the prepolymer (F) having the formula (III):

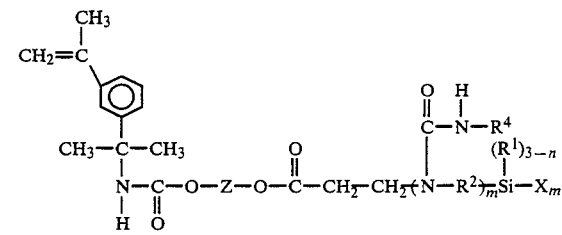

The curable resin of our invention has excellent flexibility, solvent resistance and adhesion to organic materials. Furthermore our process for preparing the resin is simpler, more easily reproducible, and results in less unwanted by-prodducts than earlier processes for preparing similar silane resins.

5 Claims, No Drawings

SILANE COATING COMPOSITION FOR AMBIENT CURE

BACKGROUND OF THE INVENTION

The present invention relates to a marked improvement over the acrylic silane resins used for coating compositions, and the process for making such resins, which were disclosed in U.S. Pat. No. 4,801,658, issued Jan. 31, 1989 to Furukawa et al. (hereinafter referred to as the '658 patent). The '658 patent discloses a curable resin having a hydrolyzable silyl group at the ends or side chains and having excellent flexibility, solvent resistance and adhesion to organic materials, and a process for preparing the curable resins.

A disadvantage of making the resin of the '658 patent is that their method of making oligomer (A) having in its molecule two or more acryloyl groups and/or methacryloyl groups (hereinafter referred to as "(meth)acryloyl group") leads to by-products or involves a multi-step synthesis.

When oligomer (A) is made in a one-step process (Ref. Examples 1, 3, and 8 of the '658 patent) both acrylyol containing hydroxy functional compounds and methacrylyol hydroxy functional compounds in a 2 to 1 ratio are used equimolar to the isocyanate of the bifunctional isocyanate containing compound. This inevitably leads to a product mixture of the desired oligomers having an acryloyl group and methacryloyl group at each end of the oligomer as well as the undesired by-product of oligomers with 2 acryloyl groups at each end of the molecule. When this product mix is subsequently reacted with the silane coupling agent (B) having active hydrogen (to form the hydrolysable silane functional prepolymer) the oligomers with two acryloyl groups on each end form unwanted bifunctional silanes with no vinyl unsaturation.

When oligomer (A) is made in a two-step process (Ref. Examples 4, 5, 6 and 7 of the '658 patent) a purer compound will be obtained. (In the two step process a methacryloyl reactive compound is first reacted with a difunctional isocyanate, and the resulting product is further reacted with an acryloyl fuctional product in an attempt to obtain an oligomer with both acrylolyl and methacryloyl functionality). The problem with this approach, however, is that difunctional telechelic products will be formed since the difference in reactivity between the two isocyanate groups is too small to be selective.

What is needed is a simplified one-step process of making an oligomer with two or more (meth)acryloyl groups [oligomer (A) in the '658 patent] which does not result in a random distribution of (meth)acryloyl groups.

SUMMARY OF THE INVENTION

We have found that by reacting m-isopropenyl α,α-dimethylbenzyl isocyanate (hereinafter referred to as m-TMI) with a compound with hydroxyl and acryloyl functionality we get an oligomer with α-methyl styrene functionality and acryloyl functionality. Our oligomer is an improvement over oligomer (A) in the '658 patent because there are no by-products, it is made by a one-step reaction and the reaction is more easily reproducible.

Another advantage of our novel process is that it is possible that the silane coupling agent (B) with active hydrogen can be added directly to the reaction kettle with the oligomer having α-methyl styrene and acryloyl functionality. The active hydrogen of the silane coupling agent reacts exclusively with the acryloyl functional group.

With oligomer (A) of the '658 patent this was not possible because the active hydrogens of the silane coupling agent (B) will not react exclusively with the acryloyl group. The active hydrogens also react to some extent with the methacryloyl group since the (meth)acryloyl groups are in excess when the silane coupling agent is added to the oligomer (A). This results again in a difunctional silane compound with no vinyl unsaturation and thus it is unable to be reacted into the acrylic resin by radical polymerization. In the '658 patent the inventors were forced to add oligomer (A) slowly to an excess of the silane coupling agent (B) in order to minimize the formation of the difunctional silane. This necessarily restricts you from the simplified step of merely adding the silane coupling agent (B) to the reactor containing oligomer (A).

We have found a further improvement to the resin of the '658 patent can be obtained by adding a difunctional silane crosslinker to the finished resin. This additional crosslinker gives us a harder film, with improved solvent resistance and improved re-repair when the coating composition is used for refinish purposes.

In accordance with the present invention, there is provided a curable resin having a number average molecular weight of 1,000 to 100,000 and compromising units of at least one prepolymer selected from the group consisting of a prepolymer (C) having a number average molecular weight of 500 to 1500 and a prepolymer (F) having a number average molecular weight of 550 to 1770, said prepolymer (C) having the formula (I):

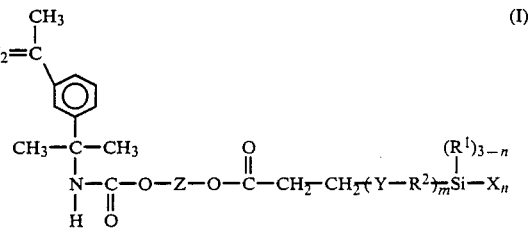

wherein $R^1$ is an alkyl, aryl or aralkyl group having 1 to 10 carbon atoms; $R^2$ is a bivalent group having 1 to 10 carbon atoms selected from the group consisting of alkylene, arylene or aralkylene groups; X is a hydrolyzable group selected from the group consisting of a halogen atom, an alkoxyl group, an acyloxyl group, a ketoxymate group, mercapto group and an alkenyloxy group; Y is —S— or

in which $R^3$ is hydrogen or an alkyl group having 1 to 10 carbon atoms, Z is a residue of an oligomer (A) having a number average molecular weight of 28 to 900 and having one group consisting of acryloyl group and one group consisting of a hydroxy group, n is an integer of 1 to 3, and m is an integer of 1 to 10; and said prepolymer (F) having formula (III):

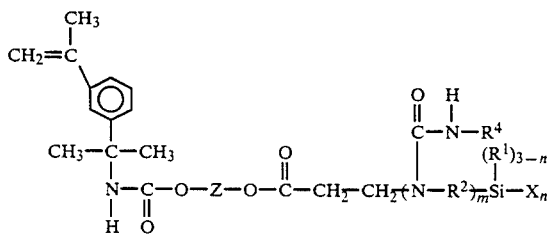

wherein R⁴ is an alkyl, cycloalkyl, aryl or an aralkyl group having 1 to 30 carbon atoms or a group having the formula $(C_2H_5O)_{3}Si$-$CH_2$-$_3$; and X, Z, R¹, R², m and n are as defined above.

The prepolymer (C) is prepared by blocking the acryloyl group of oligomer (A) with a silane coupling agent (B) having amine group and/or mercapto group of the formula (II).

wherein X, Y, R¹, R², m and n are as defined above. The prepolymer (F) is prepared by blocking active hydrogen of the amino group in the prepolymer (C) with a monofunctional isocyanate compound (E) of the formula (IV):

$$R^4-NCO \qquad (IV)$$

wherein R⁴ is an alkyl, cycloalkyl, aryl or aralkyl group having 1 to 30 carbon atoms or a group of the formula: $(C_2H_5O)_{3}Si$-$CH_2$-$_3$.

The curable resin of the present invention can be prepared by homopolymerizing the prepolymer (C) and/or (F) or copolymerizing the prepolymer (C) and/or (F) with a vinyl monomer (D) in all proportions. The prepolymer is used in an amount of at least 0.1 part by weight, preferably at least 0.5 parts by weight, and most preferrably at least 5 parts by weight based on 100 parts by weight of the monomer (D).

DETAILED DESCRIPTION

The prepolymer (C) used in the invention can be prepared by reacting the oligomer (A) having in its molecule one acryloyl group with the silane coupling agent (B) having active hydrogen. Examples of the oligomer (A) are for instance (1) a hydroxy functional acrylate, (2) a hydroxy terminal polyester acrylate and the like.

Typical hydroxy functional acrylates are 2-hydroxyethyl acrylate, and 2-hydroxy-propyl acrylate.

The hydroxy terminal polyester acrylate is prepared by carrying out the ring opening polymerization of an ε-caprolactone in the presence of a hydroxyl group containing acrylate such as 2-hydroxyethyl acrylate, with a catalyst such as organic titanate, tin chloride or perchloric acid. Examples of the polycaprolactone acrylate include for instance "Placcel FA-1" (polycaprolactone containing acryloyl group at one end and which has an Mn of 230), "Placcel FA-4" (polycaprolactone containing acryloyl group at one end, which has an Mn of 572), "Placcel FA-8" (polycaprolactone containing acryloyl group at one end, which has an Mn of 1000). Oligomer (A) (including both the hydroxy functional group and the acryloyl functional group ) has an Mn of 116 to 1000.

The silane coupling agent (B) having active hydrogen used in the invention has an amino group and/or mercapto group and is represented by the formula (II):

wherein X is a hydrolyzable group selected from the group consisting of a halogen atom, an alkoxyl group, an acyloxyl group, a ketoxymate group, amino group, an acid amide group, aminooxy group, mercapto group and an alkenyloxy group, Y is —S— or

in which R³ is hydrogen atom or an alkyl group having 1 to 10 carbon atoms, R¹ is an alkyl, aryl or aralkyl group having 1 to 10 carbon atoms; R² is a bivalent group having 1 to 10 carbon atoms selected from the group consisting of alkylene, arylene or aralkylene group, n is an integer of 1 to 3 and m is an integer of 1 to 10. Examples of the silane coupling agent (B) are, for instance, an amino group-containing silane coupling agent such as the following:

γ-aminotrimethoxysilane;
γ-aminopropyltriethoxysilane;
N-(β-aminoethyl)-γ-aminopropyltrimethoxysilane;
N-(β-aminoethyl)-γ-aminopropyltriethoxysilane;
$H_2NCH_2CH_2NHCH_2CH_2NHCH_2CH_2CH_2Si(OMe)_3$;
$H_2NCH_2CH_2NHCH_2CH_2NHCH_2CH_2CH_2Si(OEt)_3$;
γ-aminopropylmethyldimethoxysilane;
N-β-(aminoethyl)-γ-aminopropylmethyldimethoxysilane; a mercapto group containing silane coupling agent such as γ-mercaptopropyltrimethoxysilane;
γ-mercaptopropyltriethoxysilane;
γ-mercaptopropylmethyldiemthoxysilane;
$HSCH_2CH_2SCH_2CH_2CH_2Si(OMe)_3$ and
$HSCH_2Ch_2SCH_2CH_2CH_2Si(OEt)_3$.

In order to obtain the prepolymer (C) from the acryloyl group-containing oligomer (A) and the silane coupling agent (B) having active hydrogen, the oligomer (A) and the silane coupling agent (B) are mixed and reacted at ordinary temperature to 200° C. in the substantial absence of water.

Since oligomer (A) contains only one acryloyl group, the silane coupling agent (B) having active hydrogen can be added directly to the oligomer (A). The reaction is exclusively the reaction of the active hydrogen on the silane coupling agent with the acryloyl group. The active hydrogen will not react with the α-methyl styryl group of oligomer (A).

Also, in order to inhibit the radical polymerization reaction of acryloyl groups in the oligomer (A) during the reaction of the oligomer (A) and the silane coupling agent (B), it is preferable to add a polymerization inhibitor such as hydroquinone, benzoquinone, phenothiazine, butylated hydroxytoluene, or methyl hydroquinone to the reaction system before the reaction. Butylated hydroxytoluene (available from Mobay Industries) is preferable as the polymerization inhibitor because of the lack of coloration.

The reaction of the oligomer (A) and the silane coupling agent (B) can proceed in the absence of a catalyst, but there may be used a catalyst capable of promoting the addition reaction, e.g., a tertiary amine such as dimethylbenzylamine or 2,4,6-tris(dimethylaminoethyl)phenol, a quarternary ammonium salt such as benzyltrimethylammonium hydroxide or benzyltrimethylammonium chloride, an alkali such as sodium methoxide, and the like.

In the reaction of the oligomer (A) and the silane coupling agent (B), the silane coupling agent (B) and the oligomer (A) are used in an amount such that the proportion of an active hydrogen containing group (—SH, —NH and —NH$_2$) in the silane coupling agent is 0.90 to 1.1 mole per one mole of acryloyl group included in the oligomer (A). When the proportion of the silane coupling agent (B) is lower than 0.90 moles per one mole of acryloyl group gelation easily occurs when the curable resin of the invention is prepared.

A solvent may be employed or not in the reaction of the oligomer (A) and the silane coupling agent (B). Examples of possible solvents are, for instance, toluene, xylene, butyl acetate and the like.

The resulting prepolymer (C) has an Mn of 500 to 1500. The prepolymer (C) has the formula (I):

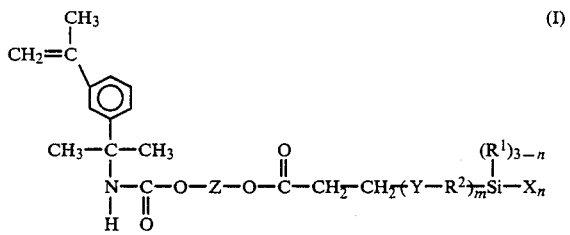

wherein Z is a residue of an oligomer (A) containing one acryloyl group. X, Y, R$^1$, R$^2$, m and n are as defined above.

The prepolymer (F) has the formula (III):

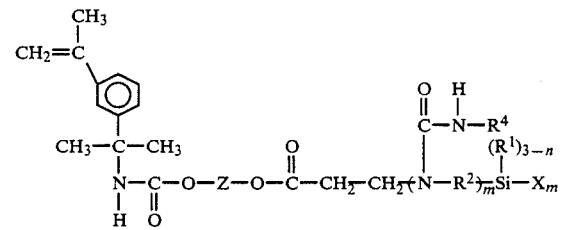

where R$^4$ is an alkyl, cycloalkyl, aryl or aralkyl group having 1 to 30 carbon atoms or a group having the formula (C$_2$H$_5$O)$_3$—Si—(CH$_2$)$_3$—, and R$^1$, R$^2$, X, Z, m, and n are as defined above. The prepolymer (F) is prepared by blocking all or a part of the active hydrogens of the amino groups in the prepolymer (C) with a monofunctional isocyanate compound (E) having the formula (IV):

R$^4$—NCO　　　　　　　　　　　(IV)

wherein R$^4$ is as defined above. Examples of the isocyanate (E) are, for instance, methyl isocyanate, ethyl isocyanate, butyl isocyanate, stearyl isocyanate phenyl isocyanate, cyclohexyl isocyanate, benzyl isocyanate, γ-isocyanatopropyltriethoxysilane, and the like.

The prepolymer (C) can be easily reacted with a necessary amount of the isocyanate (E) at ordinary temperature to 60° C. and all or a part of the prepolymers (C) are converted into the prepolymers (F).

The thus obtained prepolymer (F) has a Mn of of 550 to 1770.

The curable resin of the invention can be prepared by copolymerizing the thus obtained prepolymer (C) and/or prepolymer (F) with a vinyl monomer (D). The prepolymer (C) and the prepolymer (F), which have been separately prepared, can be copolymerized with the vinyl monomer (D) at the same time, or a mixture of the prepolymers (C) and (F), which is obtained by blocking a part of the prepolymers (C) with the monofunctional isocyanate (E), can be copolymerized with the vinyl monomer (D). The prepolymer (C) and/or the prepolymer (F) are generally copolymerized with the vinyl monomer in a random copolymerization. It may also be possible to carry out a block copolymerization or graft-copolymerization.

The vinyl monomer (D) used in the present invention is not particularly limited. Examples of the vinyl monomer (D) are, for instance, an unsaturated carboxylic ester such as methyl acrylate, methyl methacrylate, ethyl acrylate, ethyl methacrylate, butyl acrylate, butyl methacrylate, 2-ethylhexyl acrylate, 2-ethylhexyl methacrylate, stearyl acrylate, stearyl methacrylate, benzyl acrylate, benzyl methacrylate, cyclohexyl acrylate, cyclohexyl methacrylate, trifluoroethyl acrylate, trifluoroethyl methacrylate, pentafluoropropyl acrylate, pentafluoropropyl methacrylate, a diester or halfester of a polycarboxylic acid (for instance, maleic acid, fumaric acid, itaconic acid, and the like) and a linear or branched alcohol having 1 to 20 carbon atoms; an aromatic hydrocarbon vinyl compound such as styrene, α-methylstyrene, chlorostyrene, styrenesulfonic acid, 4-hydroxystyrene or vinyl toluene; a vinyl ester such as vinyl acetate or vinyl propionate; an allyl compound such as diallylphthalate; a nitrile group-containing vinyl compound such as acrylonitrile or methacrylonitrile; an epoxy group-containing vinyl compound such as glycidyl acrylate or glycidyl methacrylate; an amino group-containing vinyl compound such as dimethylaminoethyl acrylate, dimethylaminoethyl methacrylate, diethylaminoethyl acrylate, diethylaminoethyl methacrylate, vinylpyridine, aminoethyl vinyl ether, an amide group-containing vinyl compound such as acrylamide, methacrylamide, itaconic diamide, α-ethylacrylamide, α-ethylmethacrylamide, crotonamide, maleic diamide, fumaric diamide, N-vinyl pyrrolidone, N-butoxymethyl acrylamide, N-butoxymethyl methacrylamide, N,N-dimethylacrylamide, N-methyl acrylamide or acryloyl morpholine; a hydroxyl group-containing vinyl compound such as 2-hydroxyethyl acrylate, 2-hydroxyethyl methacrylate, 2-hydroxypropyl acrylate, 2-hydroxypropyl methacrylate, 2-hydroxyethyl vinyl ether, N-methylolacrylamide, N-methylolmethacrylamide, or "Placcel FA-1", "FA-4", "FA-8", "FM-4", "FM-8" (polyesters containing (meth)acryloyl group at one end available from Daicel Chemical Industries Ltd.); an unsaturated carboxylic acid such as acrylic acid, methacrylic acid, maleic acid, fumaric acid or itaconic acid or a salt thereof (for instance, alkali metal salt, ammonium salt, amine salt, and the like); an unsaturated carboxylic acid anhydride such as maleic anhydride or a salt thereof; an other vinyl compound such as vinyl methyl ether, vinyl chloride, vinylidene chloride, chloroprene, propylene, butadiene, isoprene, maleimide, N-vinylimidazole or vinylsulfonic acid, a hydrolyzable silyl group-containing vinyl compound having the formula:

$$R^6-\underset{\underset{X_n}{|}}{\overset{\overset{(R^5)_{3-n}}{|}}{Si}}$$

wherein $R^5$ is a monovalent hydrocarbon group having 1 to 10 carbon atoms selected from the group consisting of an alkyl group, aryl group or an aralkyl group, $R^6$ is an organic residue having a polymerizable double bond; and X and n are as defined above; and the like. Examples of the hydroyzable silyl group-containing vinyl compounds are, for instance:

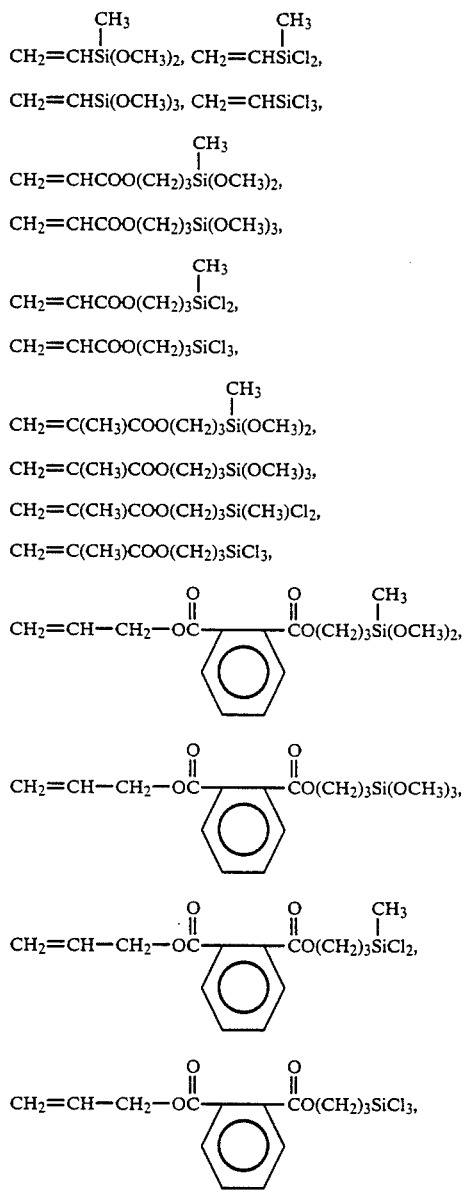

and the like.

When the hydrolyzable silyl group-containing vinyl compounds are used as the vinyl monomer (D), both the hydrolyzable silyl group in the prepolymers (C) and (F) and the hydrolyzable silyl group in the hydrolyzable silane compound can provide crosslinking points, and therefore the use of the vinyl group-containing silane compound is effective for controlling properties of the film.

The total amount of the prepolymer (C) and/or the prepolymer (F) is from 0.1 part by weight, preferably 0.5 part by weight and most preferrably at least 5 parts by weight based on 100 parts by weight of the monomer (D). When the amount of the prepolymer is less than 0.1 part by weight per 100 parts by weight of the vinyl monomer (D), the properties of the obtained curable resin cannot be improved. The prepolymers (C) and (F) may be employed independently or together in the copolymerization with the vinyl monomer (D).

The vinyl monomer (D) is copolymerized with the prepolymer (C) and/or the prepolymer (F), for instance, in the same manner as described in Japanese Unexamined Patent Publication No. 36395/1979 and No. 131145/1980, and the like. Also, a method in which a radical polymerization initiator such as AIBN (azobisisobutyronitrile) is employed, a method in which heat or rays of light or radiation is employed, a bulk polymerization method, a solution polymerization method, and the like are applicable to the copolymerization of the vinyl monomer (D) and the prepolymer (C) and/or the prepolymer (F). Among them, the solution polymerization in which an azo initiator is employed is the most preferable.

In order to stabilize the curable resin of the invention, hydrolyzable esters such a methyl orthoformate, ethyl orthoformate, methyl orthoacetate and ethyl orthoacetate, and hydrolyzable silicon compounds such as ethyl silicate, methyl silicate or methyl trimethoxysilane can be used. These dehydrating agents may be added not only during the copolymerization but also after completing the copolymerization. The amount of the dehydrating agent is from 0 to 20 parts by weight, preferably from 0 to 10 parts by weight, to 100 parts by weight of the solid content of the curable resin.

The obtained curable resin of the invention has an Mn of 1,000 to 100,000, preferably from 2,000 to 50,000.

When the curable resin of the invention is exposed to the atmospheric moisture, an infinite network structure is gradually formed. A curing catalyst may be employed or not upon curing the curable resin of the invention. Examples of the curing catalyst are, for instance, an alkyl titanate; an acid compound such as phosphoric acid; p-toluenesulfonic acid or an acid phosphoric ester, e.g., butylphosphate or dibutyl phosphate; an amine such as ethylene diamine or tetraethylenepentamine; and an organo-tin compound such as dibutyltin dilaurate or dibutyltin maleate; a basic compound such as sodium hydroxide or sodium methylate, and the like. The curable resin of the invention is cured in the same manner as described in Japanese Unexamined Patent Publication No. 131145/1989 or 139086/1980, and the like. The amount of the curing catalysts is from 0.005 to 10 parts by weight, preferably 0.1 to 8 parts by weight, to 100 parts by weight of the curable resin.

We have found that a further improvement of the coatings made up with curable resin containing prepolymer C and/or F is achieved by using difunctional silane crosslinkers.

These crosslinkers can be used from 1 to 50 parts by weight, preferably from 5 to 35 parts by weight, to 100 parts by weight of the solid portion of the curable resin. These crosslinkers are added to the finished curable resins described above.

Examples of these crosslinkers are $(CH_3O)_3Si-(CH_2)_p-Si(OCH_3)_3$ where p is 1 to 8 as disclosed in U.S. Pat. No. 4,689,085. The combination of the curable resin and the difunctional silane crosslinker both described above form a coating with exceptionally good cure characteristics, which make it extremely useful for Refinish applications.

It should be understood that the present invention is more specifically illustrated in the following Examples, but that the present invention is not limited to the Examples.

EXAMPLES

| PREPARATION OF OLIGOMER (A) | | |
|---|---|---|
| PART | INGREDIENT | WEIGHT |
| I | Meta-TMI* | 566.50 |
| | Toluene | 318.21 |
| | 2% Dibutyltindilaurate in toluene | 22.39 |
| | Butylated hydroxytoluene (an inhibitor from Mobay Industries) | 0.93 |
| | Xylene | 90.92 |
| II | Placcel FA4 ® | 1773.77 |
| | Xylene | 227.29 |
| III | Toluene | 363.66 |
| | Total | 3363.66 |
| | Loss by Stripping | 363.66 |
| | Yield | 3000.00 |

*m-isopropenyl α,α-dimethylbenzyl isocyanate.

Part I is charged to a flask equipped with stirrer, thermometer, dry nitrogen purge, cooling capability and vacuum capability. Stir the mixture until it is uniform. Part II is added to the flask over 15 minutes and then pressure is reduced to about 640 mm vacuum. This mixture is then heated to 60° C. and 364 gms of solvent are distilled of the remove traces of water. The pressure is raised to atmospheric and the mixture is heated to 100 C. and held for 3 hours or until isocyanate functionality disappears (which can be measured on an infrared spectrophotometer at 2250 cm$^{-1}$. Part III is added to the flask and the mixture is allowed to cool.

| PREPARATION OF PREPOLYMER (F) | | |
|---|---|---|
| PART | INGREDIENT | WEIGHT |
| I | γ-Aminopropyltrimethoxysilane (A-1110 ® from Union Carbide) | 425.92 |
| II | Oligomer A (from above) | 2210.15 |
| | Xylene | 71.16 |
| III | Cyclohexylisocyanate (from Mobay Industries) | 279.68 |
| | Xylene | 177.91 |
| IV | Xylene | 285.37 |
| | Trimethylorthoacetate (from Fluka Chemical Co.) | 49.81 |
| | Total | 3500.00 |

Part I is charged to a flask equipped with a stirrer, condenser, thermometer, dry nitrogen purge and cooling capability and stirred. Part II is add to the flask over 1 hour while a temperature is maintained of 25° C. plus or minus 5° C. The mixture is heated to 60° C. and held for 30 minutes or until the disappearance of the acryloyl group ( which can be monitored using a proton NMR in the 5 to 6 PPM region). Part III is added to the flask over 30 minutes while holding the temperature at 25° C. plus or minus 5° C. The mixture is then heated to 60° C. and held for 30 minutes. Next the minutes is heated to 80° C. and held for 30 minutes or until the isocyanate functionality disappears. Part IV is then added to the flask and the mixture is allowed to cool.

| PREPARATION OF THE CURABLE RESIN | | |
|---|---|---|
| PART | INGREDIENT | WEIGHT |
| I | Butylacetate | 291.05 |
| II | Styrene | 287.50 |
| | Methylmethacrylate | 583.88 |
| | Methacryloylpropyltrimethoxysilane (A-174 ® from Union Carbide) | 193.44 |
| | Prepolymer (F) (from above) | 1001.68 |
| | γ-Mercaptopropyltrimethoxysilane (A-189 ® from Union Carbide) | 26.62 |
| | Vazo 64 ® Initiator (from Du Pont) | 67.08 |
| | Butylacetate | 141.98 |
| | Methanol | 35.49 |
| | Trimethylorthoacetate | 35.49 |
| III | Vazo 64 ® (initiator from Du Pont) | 7.45 |
| | Butylacetate | 177.47 |
| IV | γ-Mercaptopropyltrimethoxysilane | 8.87 |
| | Methanol | 70.99 |
| | Trimethylorthoacetate | 70.99 |
| | Total | 3000.00 |

Part I is charged to a flask equipped with a stirrer, condenser, feed funnel, dry nitrogen purge, and thermometer. The mixture is heated to reflux. Part II is premixed and added to the flask over 5 hours while maintaining the reflux. Part III is premixed and added to the flask over 1 hour and then held for 2 hours at reflux temperature. The resulting mixture is allowed to cool to below 60° C. Part IV is premixed and added to the flask and the mixture is allowed to cool.

The resulting curable resin has a nonvolatile content of 62.8% and a Gardner-Holdt viscosity of 0.

| PREPARATION OF CLEARS USING THE CURABLE RESIN | | | |
|---|---|---|---|
| Clear Coats were formulated as follows (all parts are by weight) | | | |
| | A | B | C |
| Part A | | | |
| Curable Resin (from above) | 58.78 | 52.90 | 47.02 |
| Difunctional Silane Crosslinker[1] | — | 3.74 | 7.47 |
| Reactive Diluent (MSi51)[2] | 1.75 | 1.57 | 1.39 |
| Reactive Diluent (AFP-1)[3] | 0.35 | 0.31 | 0.28 |
| Tinuvin 1130 ® (from Ciba Geigy) | 0.36 | 0.36 | 0.36 |
| Tinuvin 292 ® (from Ciba Geigy) | 0.72 | 0.72 | 0.72 |
| Methanol | 1.55 | 1.55 | 1.55 |
| Part B | | | |
| Dibutyltindilaurate[4] | 0.63 | 0.63 | 0.63 |
| Xylene | 17.39 | 18.57 | 19.75 |
| Propylene Glycol Mono Methyl Ether Acetate | 18.47 | 19.65 | 20.83 |

-continued

PREPARATION OF CLEARS USING THE CURABLE RESIN
Clear Coats were formulated as follows
(all parts are by weight)

|  | A | B | C |
|---|---|---|---|
| Totals | 100.00 | 100.00 | 100.00 |

[1] $(CH_3O)_3Si-(CH_2)_p-Si(OCH_3)_3$ where p is 1 to 8 as disclosed in U.S. Pat. No. 4,689,085.
[2] Partially condensated products of methyl ortho silicate (N = 3) (available from Koru-Koto of Tokyo, Japan)
[3] Partially condensated products of methyl trimethoxy silane (available from Shin-Etsu Chemical Company)
[4] Catalyst available from M&T Chemical Company under the name Fascat 4201 ®

When Part A is mixed with Part B, coating compositions are ready to be sprayed.

Depending on the particular test method, coating compositions are sprayed over different substrates, and allowed to cure for 16 hours at 25° C. and 55% relative humidity. The substrate for the hardness tests (Persoz and Tukon) is glass.

For swelling ratio and gel fraction tests, free films are required. These are obtained by peeling the compositions of thermoplastic poly-olefin parts. The swelling ratio is a method of measuring crosslinking density of cured films. Therefore a known area of the free film is allowed to swell in a solvent (for instance methylene chloride) until maximum swelling is reached. The swelling ratio is then defined as the area of the swollen film over the area of the unswollen film in that particular solvent.

To obtain the gel fraction (fraction of insolubles in the cured film) a known weight of free film is boiled for six hours in acetone. After drying, the film is reweighed and the gel fraction is defined as $$\frac{\text{weight of extracted film}}{\text{weight of original film}} \times 100$$

For re-repair lifting tests the clears were sprayed over a lacquer base coat. After drying overnight the part of the coating was sanded down to the metal substrate through the clear, base-coat and the primer system with 320 sanding paper. The re-repair lifting is provoked by spraying 2 full crosscoats of the original base-coat over the sand-thru area (no primers or sealers are used). Re-repair lifting in this test is measured visually on a 0 to 5 scale, where 0 represents perfect lifting resistance and 5 lifting of the complete panel.

The solvent resistance of the different clear coat compositions is assessed by putting the different solvents on the coated panel for one hour. The deformation and/or softening of the films are rated from a scale of 10 to 0 (with 10 being perfect).

The following table summarizes the test results of the different clear coat compositions (A,B, and C from the table above) after sixteen hours dry at 25° C. and 55 percent relative humidity.

|  | Clear Coat Compositions | | | |
|---|---|---|---|---|
|  | A | B | C | Control[5] |
| Film Thickness (in mils) | 2.3 | 2.1 | 2.1 | 2.0 |
| Hardness |  |  |  |  |
| Persoz (in seconds) | 68 | 80 | 119 | 50 |
| Tukon (Knoop Hardness Number) | 0.59 | 1.23 | 3.46 | 0.75 |
| Swelling Ratio $CH_2Cl_2$ | 1.64 | 1.58 | 1.51 | 1.61 |
| Gel Fraction (%) | 86.9 | 88.7 | 91.9 | 86.5 |
| Re-Repair Lifting | 4 | 0 | 0 | 3 |
| Solvent Resist |  |  |  |  |
| Gasoline | 9 | 8 | 10 | 9 |
| Mixed Esters | 3 | 5 | 6 | 3 |

[5] The control resin is the curable resin described in U.S. Pat. No. 4,801,658 Example 8.

The results from the table above demonstrate the significant improvement in the cure properties obtained from the claimed resin combination compared to the control.

We claim:

1. A curable resin having a number average molecular weight of 1,000 to 100,000 of a copolymer of a prepolymer (F) having a number average molecular weight of 550 to 1770 with a vinyl monomer (D), said prepolymer (F) having the formula (III):

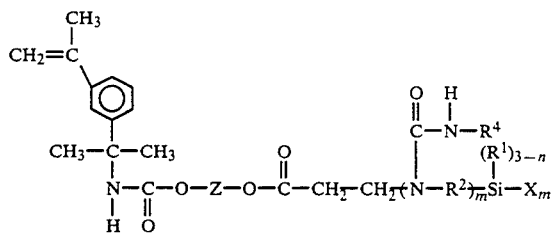

where $R^4$ is an alkyl, cycloalkyl, aryl or aralkyl group having 1 to 30 carbon atoms or a group having the formula $(C_2H_5O)_3-Si-(CH_2)_3-$; $R^1$ is an alkyl, aryl or aralkyl group having 1 to 10 carbon atoms; $R^2$ is a bivalent group having 1 to 10 carbon atom selected from the group consisting of alkylene, arylene and aralkylene groups; X is a hydrolyzable group selected from the group consisting of a halogen atom, an alkoxyl group, an acyloxyl group, a ketoxymate group, mercapto group and an alkenyloxy group; Z is a residue of an oligomer (A) having a number average molecular weight of 28 to 900 and having one group consisting of acryloyl group and one group consisting of a hydroxy group, n is an integer of 1 to 3, and m is an integer of 1 to 10.

2. A curable resin having a number average molecular weight of 1,000 to 100,000 of a copolymer of a prepolymer (C) having a number average average molecular weight of 500 to 1500 with a vinyl monomer (D), said prepolymer (C) having the formula (I):

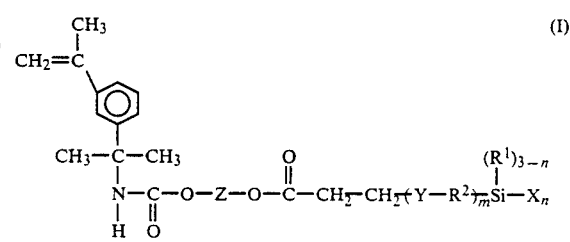

wherein $R^1$ is an alkyl, aryl or aralkyl group having 1 to 10 carbon atoms; $R^2$ is a bivalent group having 1 to 10 carbon atoms selected from the group consisting of alkylene, arylene and aralkylene groups; X is a hydrolyzable group selected from the group consisting of a halogen atom, an alkoxyl group, an acyloxyl group, a ketoxymate group, mercapto group and an alkenyloxy group; Y is —S— or

in which $R^3$ is hydrogen or an alkyl group having 1 to 10 carbon atoms, Z is a residue of an oligomer (A) having a number average molecular weight of 28 to 900 and having one group consisting of acryloyl group and one group consisting of a hydroxy group, n is an integer of 1 to 3, and m is an integer of 1 to 10.

3. The curable resin of claims 1 or 2 further comprising a difunctional silane crosslinker.

4. A process for preparing a prepolymer (C) having a number average average molecular weight of 500 to 1500 and having the formula (I):

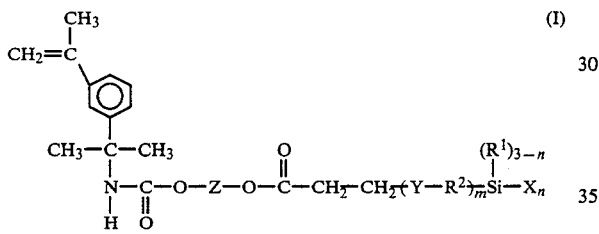

wherein $R^1$ is an alkyl, aryl or aralkyl group having 1 to 10 carbon atoms; $R^2$ is a bivalent group having 1 to 10 carbon atoms selected from the group consisting of alkylene, arylene and aralkylene group; X is a hydrolyzable group selected from the group consisting of a halogen atom, an alkoxyl group, an acyloxyl group, a ketoxymate group, mercapto group and an alkenyloxy group; Y is —S— or

in which $R^3$ is hydrogen or an alkyl group having 1 to 10 carbon atoms, Z is a residue of an oligomer (A) having a number average molecular weight of 28 to 900 and having one group consisting of acryloyl group and one group consisting of a hydroxy group, n is an integer of 1 to 3, and m is an integer of 1 to 10; comprising the following steps:

(a) bringing into contact m-isopropenyl α,α-dimethylbenzyl isocyanate with a compound having hydroxyl functionality and acryloyl functionality under reaction conditions to form an oligomer (A) with α-methyl styrene functionality and acryloyl functionality;

(b) bringing into contact the oligomer (A) from step (a) with a silane coupling agent (B) having the formula (II):

wherein $R^1$ is an alkyl, aryl or aralkyl group having 1 to 10 carbon atoms; $R^2$ is a bivalent group having 1 to 10 carbon atoms selected from the group consisting of alkylene, arylene and aralkylene groups; X is a hydrolyzable group selected from the group consisting of a halogen atom, an alkoxyl group, an acyloxyl group, a ketoxymate group, mercapto group and an alkenyloxy group; Y is —S— or

in which $R^3$ is hydrogen or an alkyl group having 1 to 10 carbon atoms, n is an integer of 1 to 3, and m is an integer of 1 to 10.

5. The process of claim 4 wherein said silane coupling agent (B) is added directly to a container containing the oligomer (A).

* * * * *